June 23, 1964  V. H. LARSON ETAL  3,138,355
CABLE EJECTION SYSTEM
Filed Aug. 21, 1962  4 Sheets-Sheet 1

INVENTORS
VINCENT H. LARSON
JAMES A. ZDRAZIL
ROBERT D. HOLMBERG
BY
ATTORNEYS

June 23, 1964  V. H. LARSON ETAL  3,138,355
CABLE EJECTION SYSTEM
Filed Aug. 21, 1962  4 Sheets-Sheet 2
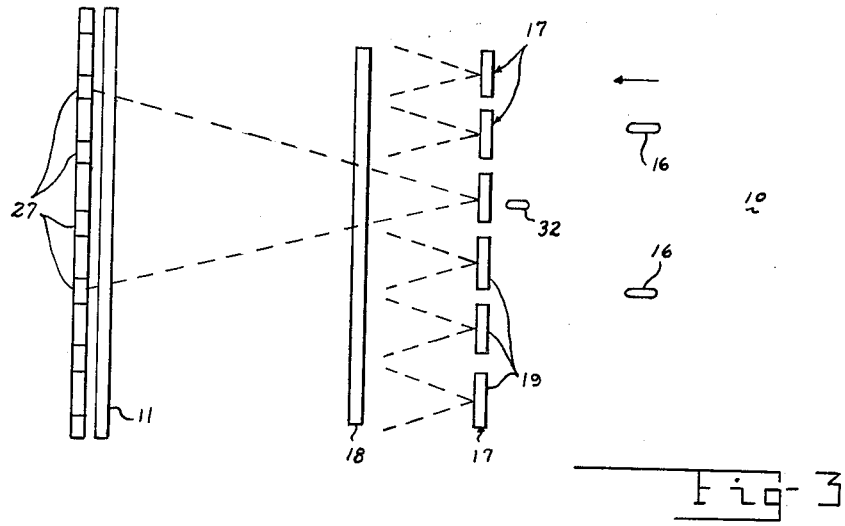
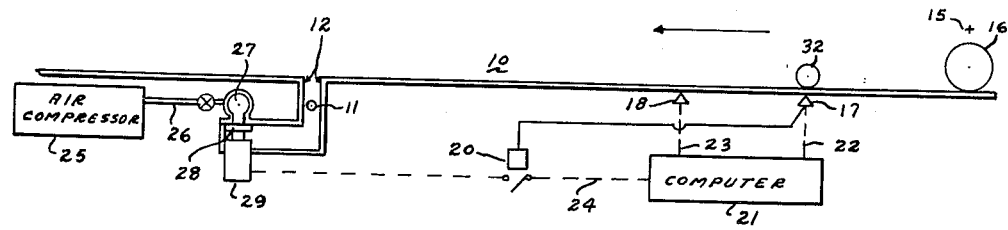
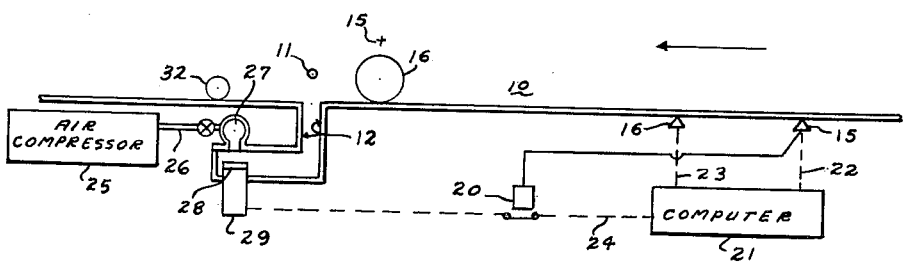
INVENTORS
VINCENT H. LARSON
JAMES A. ZDRAZIL
ROBERT D. HOLMBERG
BY
ATTORNEYS

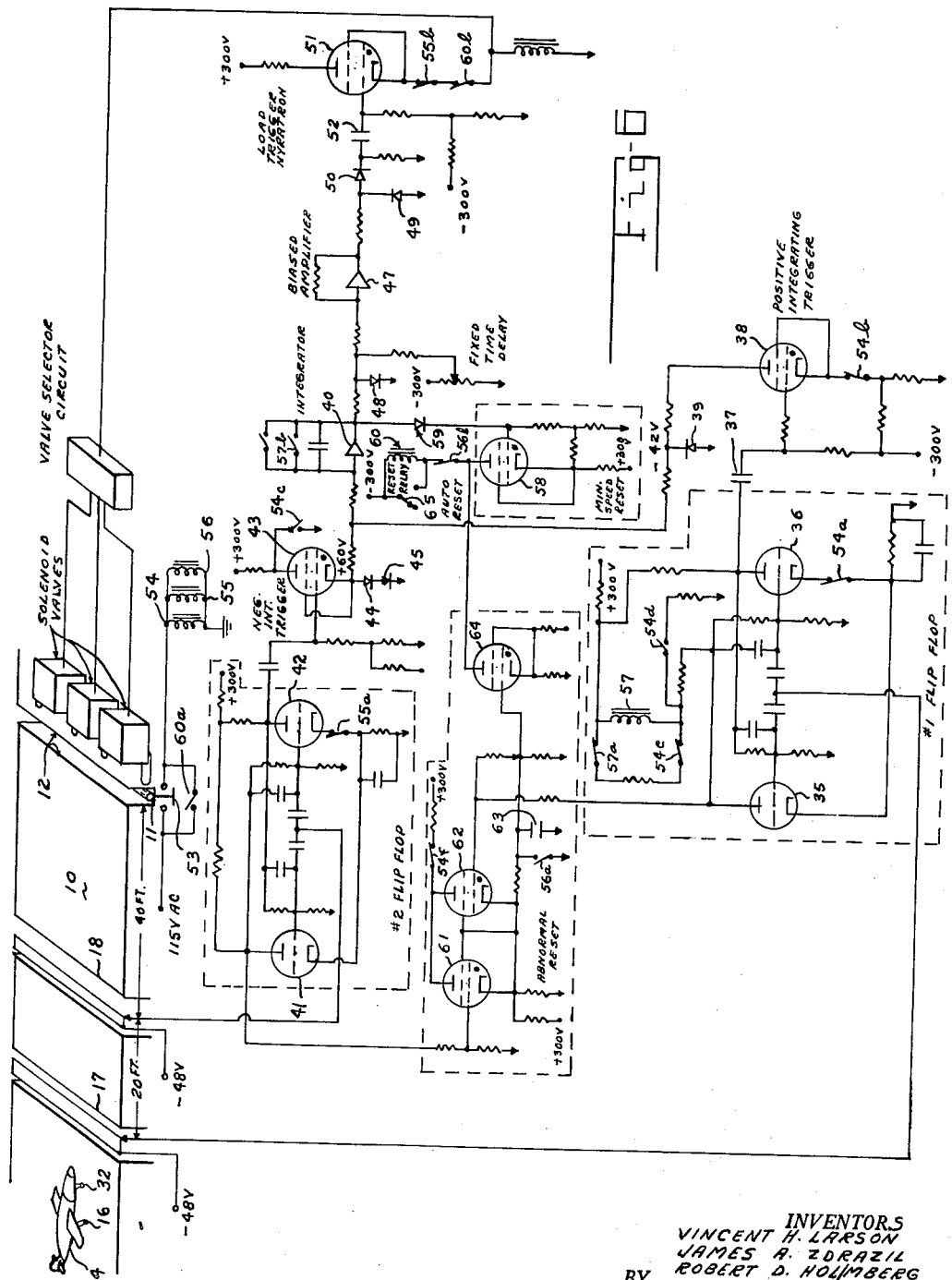

United States Patent Office 3,138,355
Patented June 23, 1964

3,138,355
CABLE EJECTION SYSTEM
Vincent H. Larson, Mound, James A. Zdrazil, Hopkins, and Robert D. Holmberg, Minneapolis, Minn., assignors to the United States of America as represented by the Secretary of the Air Force
Filed Aug. 21, 1962, Ser. No. 218,471
9 Claims. (Cl. 244—110)

This invention relates generally to vehicle arresting systems and, more particularly, to an arrestor system for an aircraft runway.

Present day jet powered aircraft are without an operational reverse thrust mechanism analogous and extensively in use as the reverse pitch propeller and, therefore, require an effective runway of extended length. An operational arresting system is needed to shorten the distance of landing roll after touch down. Furthermore, in an emergency, occurring in the event of an aborted take-off or in the event of a braking failure upon landing, an arresting system is needed to bring an aircraft to a halt in an overrun area of the runway.

Modern aircraft employ landing gear having a nose wheel at the fore section of the aircraft, which is ordinarily not relied upon to support a major portion of the aircraft's weight, but is utilized to maintain equilibrium and to facilitate steering. Whereas landing speeds approach 200 knots, it would indeed be a hazardous and unstable operation to attempt arrestment through engagement with the nose wheel. Whereas the desired result of the arresting system is to bring the aircraft to a halt without incurring damage, it is necessary that the runway arrestor engage a structure of sufficient strength and positioned on the aircraft for maximum stability and safety. The main or rearmost landing gear support, which has been designed and positioned to absorb landing impact, may be engaged for safe operation, or in an operational application, an aircraft modification, such as a hook, may be utilized. Of course, for an emergency operation, available to all aircraft, including unmodified aircraft, engagement would be with the main landing gear support. In either application, emergency or operational, the arrestor system must selectively allow the nose wheel to pass unhindered prior to interposing arrestment engagement, a critical requirement complicated in a system applicable to all type aircraft, regardless of differences in wheel base and velocity conditions. In addition, the great number of aircraft in operation necessitates an arresting system capable of immediate reload for a plurality of repeat applications. For instance, operational application may require a repeat cycle of arrest and reload at a frequency of one aircraft every thirty seconds.

Thus, it is an object of this invention to provide a runway arresting system that will safely halt an aircraft without incurring damage.

It is an object of this invention to provide a runway arresting system that has both operational and emergency application.

It is another object of this invention to provide a runway arresting system that may be utilized for successive repeat applications within a short period of time.

It is still another object of this invention to provide a runway arresting system that may be utilized by unmodified aircraft regardless of differences in wheel base and velocity conditions.

Other objects and a fuller understanding of the invention may be had by referring to the following description and claims, taken in conjunction with the accompanying drawings in which:

FIGS. 3, 4 and 5 are schematic diagrams illustrating the operational scheme of the arresting system of the invention; and FIGS. 6 and 7 are schematic diagrams illustrating an electronic computer system utilized by the invention.

Figure 1:
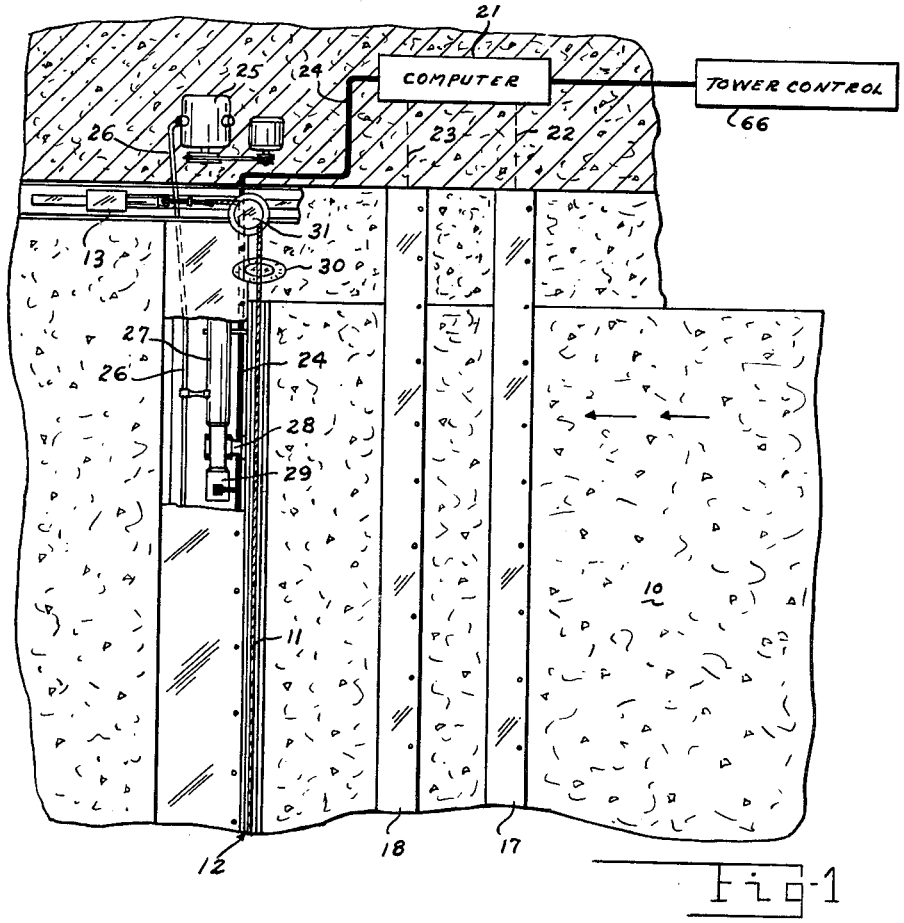
FIG. 1 is a schematic plan view of a runway arresting system.

With reference to the drawings, an arrestor means, for engagement across runway surface 10 is provided by anchored arrestor cable 11. As illustrated, cable 11 is fully extended and loosely contained below surface 10 in transverse slot 12 to allow an unobstructed traffic flow thereover. Cable 11 is preferably of steel construction and anchored at opposite ends through energy absorbers 13 of any known type suitable for the absorption of arrestment shock.

Intercept instant, the instant of time when cable 11 is ejected upward out of slot 12 into engagement above surface 10, is dependent upon the velocity and location of an approaching aircraft 14. If a reference point 15 on main landing support 16 has known instants of location along surface 10, an intercept instant may be determined. Thus, a pair of spaced sensory means, at stations of known location, are employed to give impulses indicating instants of the landing support's presence thereat. The sensory means shown are a pair of mechanical contact switches 17 and 18 linearly extending transverse and approximately flush to surface 10 in spaced parallel relationship to slot 12. Switch 17 is composed of segments 19, with each segment connected for closing a desired number of relay switches 20, and by virtue of this segmentation, to thereby cause a lateral location selection.

Computer means are furnished by an electronic integrator computer 21. The principal component circuits forming the computer 21, schematically diagrammed in FIG. 6, are a combination of two bistable multi-vibrator or flip flop circuits, each connected through a separate trigger circuit to an integrating circuit having an output passing through a biased amplifier circuit to a triggering thyratron circuit. Electrical conduits 22 and 23 connect switches 17 and 18 to the input of computer 21, each at a respective flip flop circuit. The output of computer 21 is connected through conduits 24 to one side of relay switches 20.

Ejector means may be defined as the system supplying the energy required for propelling the cable 11 from slot 12 into engagement above runway surface 10. Many systems are available, however, the utilization of an expanding gas as an energy source has been found herein to be ideal for a nearly instantaneous reaction. In the mode of this invention, the cable 11 is analagous to a piston and the walls of slot 12 are analagous to cylinder walls. Although clearance between the cable and slot be large compared to usual piston and cylinder combinations, no particular attempt is made to prevent or reduce leakage, since an instantaneous admittance or creation of a high pressure expanding gas in slot 12 beneath cable 11 provides an energy force sufficient to eject cable 11 upward out of slot 12. For repeating cyclic operation, a practical source of expanding gas is a compressed air system with an air compressor 25 supplying energy in the form of compressed air through conduits 26 for storage in a plurality of reservoirs 27, equally spaced along slot 12 and beneath surface 10 as shown. A plurality of valves 28, opening into slot 12 beneath cable 11, connect each individual reservoir 27 to slot 12 through a separate valve 28. Valves 28 are opened upon activation of solenoids 29 connected at one side of relay switches 20. A separate relay switch 20"

is provided for each valve solenoid 29 and connected in such manner that an activating signal transmitted from computer 21 through conduits 24 activates only those solenoids having a closed relay switch.

After aircraft arrestment and subsequent disengagement of cable 11, retraction by the energy absorbers 13 will cause the cable to be drawn back to slot 12. Two positioning sheaves 31 are mounted to freely turn at a fixed position, one at each end of slot 12 (only one sheave visible in FIGURE 1). The cable 11 passes around each sheave 31, as demonstrated, to position a cable portion at both ends of slot 12. Naturally, due to the cable's heavy weight, other cable portions may remain on runway 10 beside slot 12. A sharp striking of cable 11 will induce a vibrant wave to travel therealong, thereby displacing those cable portions remaining on the runway 10 to drop into slot 12. Numerous striking means are available, however, a reciprocating ram activated by the same fluid presure source utilized for cable ejection has been found to be most practical. A schematic end view is shown in FIGURE 1 of a ram 30 which strokes vertically upward to strike the bottom of cable 11. In this embodiment ram 30 is a conventional pneumatic type supplied by air compressor 25 through suitable connecting conduits (not shown).

Figure 2:
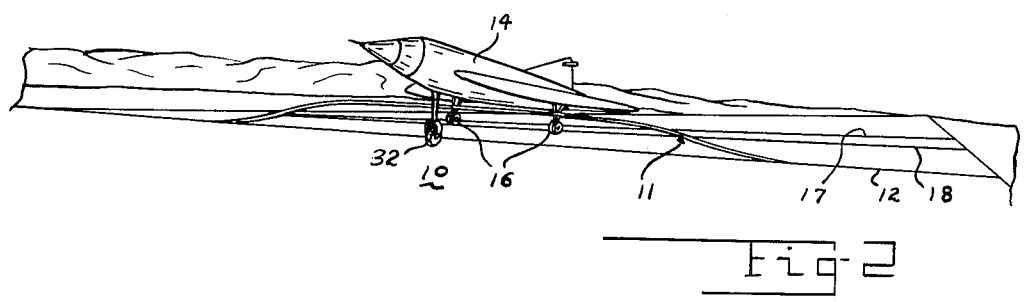
FIG. 2 is a perspective view showing a portion of an arrestor cable ejected upward into engagement with the main landing support of an aircraft.

The sequence of arresting system operation will be described in conjunction with FIGS. 3, 4 and 5. Sequence is initiated by nose wheel 32 of approaching aircraft 14 tripping a segment 19 of sensory switch 17. Segment 19 affords a selection of a lateral portion of cable 11, indicated within the dashed lines of FIG. 3, by closing relay switches 20 corresponding to the reservoirs 27 at the selected portion. An impulse, simultaneously sent through conduit 22, prepares computer 21 for a subsequent timing operation. Upon passage of nose wheel 32 over switch 18, an impulse is sent through conduit 23 preparing computer 21 for a subsequent operation determining intercept instant. Main support 16 trips switch 17 sending a second impulse through conduit 22 activating computer 21 to commence a timing operation indicating the duration of travel between switches 17 and 18. Upon arrival of support 16 at switch 18, a second impulse through conduit 23 indicates the termination of travel duration between switches 17 and 18 while simultaneously activating computer 21 for an operation determining intercept instant. As support 16 travels from switch 18 to slot 12, computer 21 completes a determination of intercept instant and transmits a signal therefor along conduit 24. Closed relay switches 20 convey the activating signal to solenoids 29 opening valves 28 and admitting compressed air from reservoir 27 into slot 12 beneath cable 11. Thus, as illustrated by FIG. 2, a portion of cable 11 directly in front of aircraft 14 is ejected into arrestment engagement with main supports 16.

Figure 7:
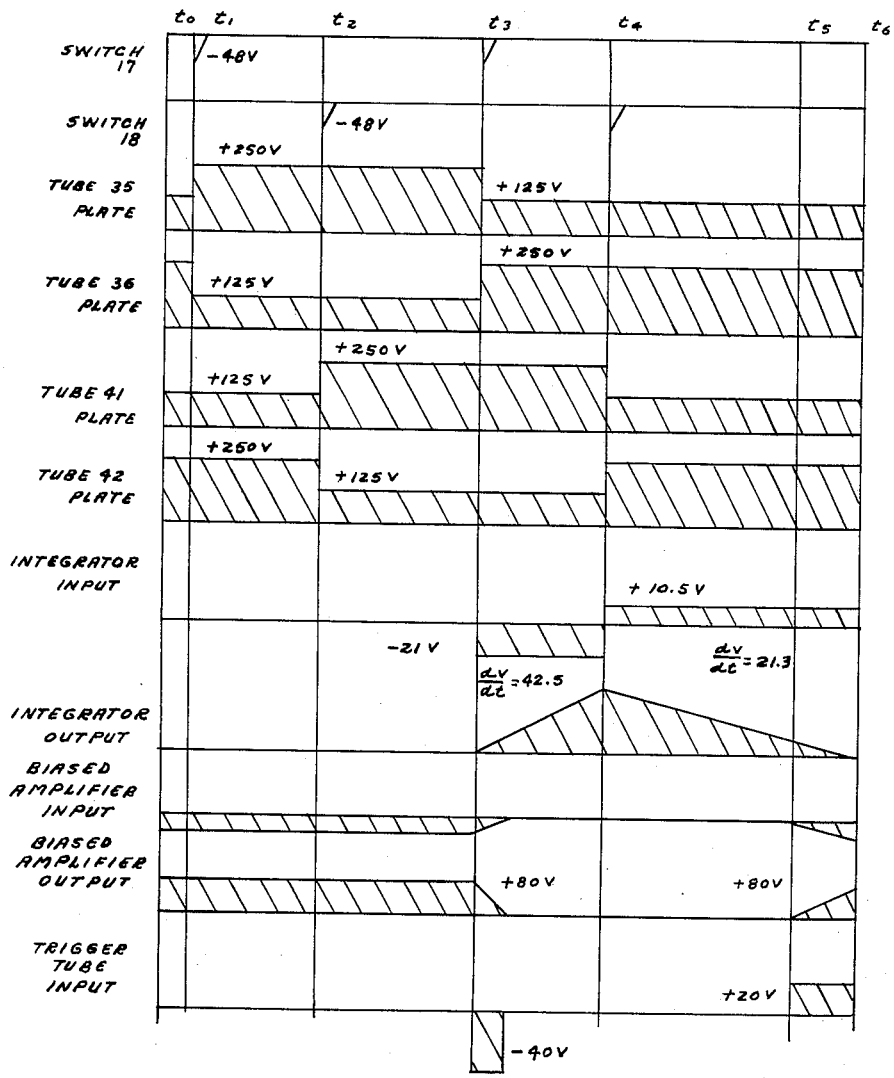

Computer functions are now described with reference to FIGS. 6 and 7. Since an intercept instant is directly determined upon impulses of main support location, it is essential for such purposes, that earlier nose wheel impulses be distinguished and in effect ignored. This may be accomplished by multivibrator circuits, one for each sensor switch, which produce a negative output upon the first or nose wheel impulse. Each output is connected to an integrator circuit through a thryatron circuit which conducts only upon receipt of a positive output. The subsequent impulses of main support location change the output from negative to positive, thus causing the thyratron to conduct and integration to commence.

The first multivibrator, labeled flip flop #1, is actuated by switch 17 and employs vacuum tubes 35 and 36. The two stable states of operation existing are when tube 35 conducts with tube 36 not conducting, and the converse. A change in state is made each time switch 17 is tripped. The normal state, the condition prior to sequence initiation by nose wheel 32, indicated at time $t_0$ on FIG. 7, exists when tube 35 conducts. When nose wheel 32 trips switch 17, a negative —48 volt pulse applied to the flip flop causes a change in state, with the plate voltage of tube 36 changing instantaneously from +250 volts to +125 volts as indicated at time $t_1$. This state is maintained until main support 16 trips switch 17, changing back to the original state as the plate voltage instantaneously changes from +125 volts to +250 volts, as indicated at time $t_3$. This positive-going transient is coupled through capacitor 37 to the grid of thyratron 38, causing the thyratron 38 to conduct. As thyratron 38 conducts, a —42 volt zener diode 39 establishes a —21 volt reference voltage at the input to the integrator-amplifier 40. The integrator-amplifier 40 inverts and integrates the —21 volt voltage and provides a positive going ramp voltage rising at +42 volts per second. This integration continues until the main support 16 trips switch 18.

The second bistable multivibrator, labeled flip flop #2, is actuated by switch 18 and employs vacuum tubes 41 and 42. The normal state, at time $t_0$, has tube 41 conducting and tube 42 cut-off. When nose wheel 16 trips switch 18, at time $t_2$, the state reverses with tube 42 plate voltage having a negative change from +250 volts to +125 volts. At time $t_4$ when main support 16 trips switch 18, the state again returns to normal, tube 42 plate voltage changing positively from +125 to +250 volts, which causes the trigger thyratron 43 to conduct through the zener diodes 44 and 45 establishing a positive voltage at the integrator input. The integrator input voltage instantaneously changes from —21 to +10.5 volts as indicated at time $t_4$. The change in integrator input causes the integrator output to change from a positive slope of +42.5 volts per second to a negative slope of —21.3 volts per second.

Computing is based on two electronic integrations, one positive and one negative. Positive integration is initiated by flp flop #1 and continues until cut off by initiation of negative integration by flip flop #2. The ratio of the positive to negative integration rates is a function of the ratio of distances between switches 17 and 18 and slot 12. Thus, a positive integration, measuring travel interval between switches 17 and 18, commences at time $t_3$, rising at a rate of +42.5 volts per second. At time $t_4$, indicating initiation of negative integration, the slope of integrator output, shown in FIG. 7, changes from +42.5 to —21.3 volts per second. During negative integration, travel is between switch 18 and slot 12, and whereas the distance therebetween is twice the distance between switches 17 and 18, the travel interval during negative integration will be twice the travel interval measured by positive integration. By providing a negative integration rate of one half the rate of positive integration, it is apparent that the negative integration requires twice the time to integrate over the same voltage range as the positive integration. In this manner, the integrator output, at a rate of —21.5 volts per second, passes through zero volts at the same instant that reference point 15 arrives over slot 12.

An electrical bias is provided to compensate for the finite amount of time required to close relays, actuate solenoids, move mechanical linkage, eject cable from the slot and travel cable to engagement height. This is accomplished by a fixed time delay voltage which effectively biases the integrator output to pass through zero at an earlier instant. Delay compensation voltage is proportional to the fixed time delays encountered and is shown on FIG. 7 as a negative voltage at the biased amplifier input. Biased amplifier 47 accepts the information provided by the summation of integrator output and the fixed time delay adjustment, and is biased by diodes 48, 49 and 50, so that only positive voltages may appear at its output. As shown by FIG. 7, amplifier 47 inverts the normally negative input voltage resulting in an amplified positive output. At time $t_3$, when integrator output voltage begins to rise, amplifier input also rises towards zero volts causing an amplified decrease in amplifier output voltage. The resulting differentiation of negative amplifier output slope produces a negative pulse at the grid of the load trigger thyratron 51. Biasing diode 48 prevents positive voltages from appearing at the input, thus both input and output of the biased amplifier remain at zero volts until time $t_5$. Diode 49 and diode 50 allow only positive voltages to be applied to the differentiating capacitor 52 at the grid of the load trigger thyratron 51. At this time $t_5$, the biased amplifier input voltage starts to swing negative, causing an amplified positive going transient at the amplifier output. The positive going transient is differentiated, and a positive voltage pulse occurs at the load trigger thyratron 51.

Load trigger thyratron 51 is normally not conducting since a negative bias voltage at the grid prevents conduction. At time $t_5$, a positive trigger pulse from the biased amplifier output overcomes the bias voltage causing thyratron 51 to conduct a signal energizing solenoid valves 28.

The computer circuit requires resetting upon completion of cycle to ensure the flip flops are returned to normal state and that all thyratrons are returned to normal nonconducting state. Reset takes place when cable 11 leaves slot 12, simultaneously closing cable ready switch 53 to energize relays 54, 55 and 56. Relay contact 54a, in the cathode circuit of tube 36, ensures normal state for flip flop #1, while relay contact 55a similarly ensures normal state for flip flop #2. Relay contacts 54b and 54c in the cathode and plate circuits of thyratrons 38 and 43 respectively, return the normal nonconducting state. Relay contact 55b in the cathode circuit of thyratron 51 returns the normal nonconducting state.

The 57b relay contact across integrator amplifier 40 is closed whenever the circuit is not in operation to prevent integration drift during periods between operations. Relay 57 is normally energized by the current through tube 35. When switch 17 is tripped by nose wheel 16, current through tube 35 is cut off deenergizing relay 57, making integrator 40 ready to accept input voltages. Although tube 35 current is sufficient to hold contact 57a closed, additional current is needed to initially pull contact 57a shut. The additional current is supplied at reset through relay contact 54d while another contact 54e opens the shunt resistor circuit across the coil of relay 57. The abnormal reset circuit and the minimum speed reset circuit are returned to normal by three contacts of relay 56. Upon return of cable 11 to slot 12, relays 54, 55 and 56 are deenergized and the system is ready for another operation.

The computer 21 includes other circuits as protective features of the system. A limit circuit is incorporated to prevent actuation at velocities below 10 knots. The minimum speed reset circuit involves thyratron 58 which is normally prevented from conducting by a biasing circuit which is connected to the +300 volt supply. Thyratron 58 grid is connected to the integrator output through diode 59. Slower speeds have correspondingly longer travel intervals, thus building up a larger positive integration output voltage. The minimum speed circuit is designed so that thyratron 58 conducts when the integrator output exceeds determined positive level indicating a minimum speed. Upon conduction of thyratron 58, reset relay 60 is energized closing contact 60a to energize relays 54, 55 and 56, and thereby prevent triggering of the system.

In the abnormal event that a timer circuit sequence is started but never completed, the system would not be set up properly for an approaching aircraft. The abnormal reset circuit will automatically reset the timer circuit within seven seconds after the initiation of an abnormal event. The positive-going transient, produced by a change in state of either flip flop, is coupled into the grid of a thyratron 61 or 62, causing conduction. A charge will accumulate across capacitor 63 which is connected between the grid of thyratron 64 and ground. After approximately seven seconds, the charge accumulated across capacitor 63 will be sufficient to cause thyratron 64 to conduct and energize reset relay 60 thereby resetting the circuit. The reset circuit may be rendered inoperative by use of the auto-reset-in-out switch 65 and the entire computer circuit may be coupled to a tower control unit 66 for control thereof.

It will be understood that various modifications and changes may be made in this invention without departing from the spirit and scope thereof as set forth in the appended claims.

We claim:

1. A runway arresting system for halting an aircraft traveling therealong, comprising: a pair of sensory means linearly extending transverse said runway in spaced parallel relationship for conveying impulses of said aircraft's location; computer means to receive said impulses for determining an intercept instant and transmitting a timed signal therefor; an arrestor cable receivable in a slot traversing said runway in spaced parallel relationship with said sensory means, said cable extending freely therethrough and having ends anchored to energy absorbers; and ejector means activated by said signal for admitting an expanding gas into said slot, beneath and directly contacting said cable, acting as a free piston therein, to eject said cable upward above said runway into engagement with said aircraft.

2. A runway arresting system for halting an aircraft traveling therealong, comprising: a pair of linear sensory switches extending transverse said runway in spaced parallel relationship and adapted to convey impulses of said aircraft's location along said runway; a computer adapted to receive said impulses for determination of an intercept instant, and to transmit a timed signal therefor; an arrestor cable receivable in a slot traversing said runway in spaced parallel relationship with said switches, said cable freely extending therethrough and having ends anchored to energy absorbers; and ejector means activated by said signal for admitting compressed air into said slot beneath and directly contacting said cable, acting as a free piston therein, to eject said cable upwards above said runway into engagement with said aircraft.

3. A runway arresting system for halting an aircraft traveling therealong, comprising: a pair of linear sensory switches extending transverse said runway in spaced parallel relationship and adapted to convey impulses of said aircraft's location along said runway; a computer adapted to receive said impulses for determination of an intercept instant and to transmit a timed signal therefor; an arrestor cable receivable in a slot traversing said runway in spaced parallel relationship with said switches, said cable freely extending therethrough and having ends anchored to energy absorbers; a compressed air system having a reservoir below said runway proximate said slot; a valve connecting said reservoir to said slot, said valve having an opening beneath said cable and adapted for activation by said signal to admit compressed air into direct contact with said cable, acting as a free piston within said slot, to eject said cable upward into engagement with said aircraft.

4. A runway arresting system for halting an aircraft traveling therealong, comprising: a pair of linear sensory switches extending transverse said runway in spaced parallel relationship and adapted to convey impulses of said aircraft's location along said runway; a computer adapted to receive said impulses for determination of an intercept instant, and to transmit a signal therefor; an arrestor cable receivable in a slot traversing said runway in spaced parallel relationship with said switches, said cable freely extending therethrough and having ends anchored to energy absorbers; a compressed air system having a plurality of reservoirs below said runway at spaced intervals proximate said slot; a plurality of valves connecting said reservoirs to said slot, said valves having openings beneath said cable and adapted for activation by said signal to admit compressed air into direct contact with said cable, acting as a free piston within said slot, to eject said cable upwardly into engagement with said aircraft.

5. A runway arresting system for halting an aircraft traveling therealong, comprising: a pair of linear sensory switches extending transverse said runway in spaced parallel relationship and adapted to convey impulses of said aircraft's location along said runway, one of said switches having lateral selection segments; a computer adapted to receive said impulses for determination of an intercept instant, and to transmit a signal therefor; an arrestor cable receivable in a slot traversing said runway in spaced parallel relationship with said switches, said cable freely extending therethrough and having ends anchored to energy absorbers; a compressed air system having a plurality of reservoirs below said runway at spaced intervals proximate said slot; a plurality of valves connecting said reservoirs to said slot with openings beneath said cable, said valves adapted to be primed by said lateral selection segments for activation by said signal to admit compressed air into direct contact with said cable, acting as a free piston within said slot, to eject a portion of said cable upward into engagement with said aircraft.

6. A runway arresting system for halting an aircraft traveling therealong, comprising: a pair of linear sensory switches extending transverse said runway in spaced parallel relationship and adapted to convey impulses of said aircraft's location, one of said switches having lateral selection segments; an electronic integrator computer adapted to receive said impulses for determination of an intercept instant, and to transmit a signal therefor; an arrestor cable receivable in a slot traversing said runway in spaced parallel relationship with said switches, said cable freely extending therethrough and having ends anchored to energy absorbers; a compressed air system having a plurality of reservoirs below said runway at spaced intervals proximate said slot; a plurality of valves connecting said reservoirs to said slot, said valves having openings beneath said cable and adapted to be primed by said lateral selection segments for activation by said signal to admit compressed air into direct contact with said cable, acting as a free piston within said slot, to eject a portion corresponding to said lateral segments of said cable upward into engagement with said aircraft; and a reciprocating ram beneath said cable adapted to induce a wave therein upon reload positioning of the same.

7. In an aircraft runway arresting system having an arrestor cable in a slot beneath the runway surface, a cable ejector comprising: a source of high pressure gas; and means for admitting said gas into said slot, beneath and directly contacting said cable, acting as a free piston therein, to force said cable upward above said surface.

8. In an aircraft runway arresting system having an arrestor cable contained in a slot beneath the runway surface, a cable ejector comprising: a compressed air system with a high pressure supply reservoir; a valve connecting said reservoir to said slot, said valve having an opening beneath said cable and adapted upon actuation to admit compressed air beneath and directly contacting said cable, acting as a free piston therein, forcing said cable upward above said surface.

9. In an aircraft runway system having an arrestor cable in a slot beneath the runway surface, a cable ejector comprising: a compressed air system with a plurality of high pressure supply reservoirs at spaced intervals proximate said slot and below said surface; a plurality of valves connecting said reservoirs to said slot with openings beneath said cable, said valves adapted upon selective activation to admit compressed air beneath and directly contacting said cable, acting as a free piston therein, to force a portion of said cable upward out of said slot and above said surface.

References Cited in the file of this patent

UNITED STATES PATENTS

| | | |
|---|---|---|
| 2,355,948 | Bonstow et al. | Aug. 15, 1944 |
| 2,448,039 | Lynn | Aug. 31, 1948 |
| 2,777,653 | Cotton et al. | Jan. 15, 1957 |
| 2,846,166 | Daniels et al. | Aug. 5, 1958 |
| 2,955,209 | Eckweiler et al. | Oct. 4, 1960 |